United States Patent [19]

Andersson et al.

[11] 4,378,978

[45] Apr. 5, 1983

[54] DEGASSING OF LIQUID MIXTURES

[75] Inventors: Nils E. Andersson; Sten Eriksson; Bengt Sinner, all of Västeras, Sweden

[73] Assignee: ASEA Aktiebolag, Västeras, Sweden

[21] Appl. No.: 295,086

[22] Filed: Aug. 21, 1981

[30] Foreign Application Priority Data

Aug. 25, 1980 [SE] Sweden .............................. 8005927

[51] Int. Cl.³ .............................................. B01D 19/00
[52] U.S. Cl. ............................................. 55/52; 55/55; 55/189
[58] Field of Search ...................... 55/52, 55, 189, 204

[56] References Cited

U.S. PATENT DOCUMENTS

| | | | |
|---|---|---|---|
| Re. 29,472 | 11/1977 | Kaiser | 55/55 X |
| 2,614,656 | 10/1952 | Clark et al. | 55/55 |
| 2,685,937 | 8/1954 | Clark et al. | 55/52 X |
| 2,751,031 | 6/1956 | Smith et al. | 55/52 X |
| 4,219,340 | 8/1980 | Kaiser | 55/55 X |
| 4,238,208 | 12/1980 | Frykhult et al. | 55/189 X |

Primary Examiner—Robert H. Spitzer
Attorney, Agent, or Firm—Watson, Cole, Grindle & Watson

[57] ABSTRACT

The invention relates to a method of, and system for, degassing a mixture of a liquid first material, e.g. white water, and at least one second material, e.g. paper-making stock, the mixture being regeneratively pumped through cleaning means, e.g. a vortex cleaner, to an aeration tank. The regenerative pumping may be controlled to control the sub-atmospheric pressure applied to, and the liquid level in, the aeration tank.

15 Claims, 3 Drawing Figures

DEGASSING OF LIQUID MIXTURES

TECHNICAL FIELD

This invention relates to a method of degassing a mixture of a liquid first material, e.g. white water, and at least one second material, e.g. paper-making stock or stuff, comprising mixing the first and second materials and pumping the mixture so formed into an aeration tank via mixture cleaning means, e.g. a vortex cleaner. The invention also relates to a system for performing such a method.

BACKGROUND ART

During stock preparation in paper manufacture certain paper qualities require that the stock/white water mixture be degassed in an aeration or degassing tank before it is supplied to a headbox via a headbox pump. The degassing takes place by maintaining a negative or sub-atmospheric pressure in the aeration tank by the connection of a vacuum pump thereto, the negative pressure corresponding to the boiling point of the stock at the stock temperature in question and enabling air and other gases to be removed from the stock/white water mixture. The mixture level in the tank is normally controlled by the provision of a spillway in the tank or by the provision of a level regulator which influences a valve in a return conduit. The negative pressure maintained in the aeration tank is normally accomplished by locating the tank at a high level relative to a mixing pump for mixing the stock or paper pulp with white water from a wire pit. This relatively high level of the aeration tank requires long supply and return conduits to be connected to the aeration tank which increases the cost of erecting the paper making plant.

The difference in pressure between that generated across the mixing pump and the negative pressure in the aeration tank must be sufficiently great to overcome the static lifting height between, for example, the levels of liquid in the wire pit and the aeration tank, and the pressure drop in filters, conduits and vortex cleaners between the mixing pump and the aeration tank. The pressure drops across different types of vortex cleaners normally varies between 10 and 30 meters of water gauge (mwg). There are mainly two types of vortex cleaners, namely, one type which works towards a negative pressure and one type which works towards an overpressure. Because of the negative pressure in the aeration tank, all liquid levels to which the aeration tank delivers flows must be located about 10 meters below the liquid level of the aeration tank, which is another reason for the high location of the tank. If the pressure drop across the vortex cleaners is low, which is aimed at, or such vortex cleaners are required which are designed to function towards an overpressure, this high location of the aeration tank is required to prevent stock/white water mixture from the mixing pump and rejects, i.e. dirty material, from the vortex cleaners, from flowing into the aeration tank, thus jeopardizing or making impossible the intended functions.

The present invention aims to provide a method of, or system for, degassing mixtures of first and second materials in an aeration tank in which the above-mentioned drawbacks are substantially eliminated.

SUMMARY OF THE INVENTION

According to one aspect of the invention, a method of degassing a mixture of a liquid first material and at least one second material, comprises mixing the first material with said second material(s) and regeneratively pumping the mixture so formed into an aeration tank via mixture cleaning means.

The provision of regenerative pumping enables the aeration tank to be at a lower level than otherwise would have been possible. Thus, when the method is applied to degassing a stock/white water mixture in a paper making process, it is possible to clean and degas the mixture with the smallest possible energy consumption, with the shortest possible length of conduits to and from the aeration tank, and with minimum costs for erection of apparatus for performing the degassing method. Furthermore, the overflow in the aeration tank may be eliminated by common control of the regenerative pumping into and pumping out of the aeration tank. This makes it possible to regulate the level as well as the negative pressure in the aeration tank.

According to another aspect of the invention, a system for degassing a mixture of a liquid first material and at least one second material comprises container means for containing the first material, an aeration tank, mixture cleaning means (e.g. vortex cleaning means), and pumping and mixing means for mixing first material from the container means with the second material and pumping the mixture through the mixture cleaning means and into the aeration tank, wherein the pumping and mixing means comprises a regenerative pump intended to slow down the flow rate of mixture through, whilst permitting a pressure drop across, the mixture cleaning means, and wherein the aeration tank, mixture cleaning means and pumping and mixing means are positioned substantially at the same level as or beneath the top of the container means.

According to a further aspect of the invention, a system for degassing a mixture of stock and white water, comprises white water container means, an aeration tank, mixture cleaning means (e.g. vortex cleaning means), pumping and mixing means for mixing white water from the container means with stock and pumping the mixture through the mixture cleaning means and into the aeration tank, and a headbox pump for pumping the degassed mixture from the aeration tank, wherein the pumping and mixing means comprises a regenerative pump intended to slow down the flow rate of mixture through, whilst permitting a pressure drop across, the mixture cleaning means, and wherein the aeration tank, the mixture cleaning means and the pumping and mixing means are positioned substantially at the same level as, or beneath, the top of the container means.

The invention will now be described, by way of example, with reference to the accompanying drawings.

DESCRIPTION OF THE PREFERRED EMBODIMENT

Figure 1:
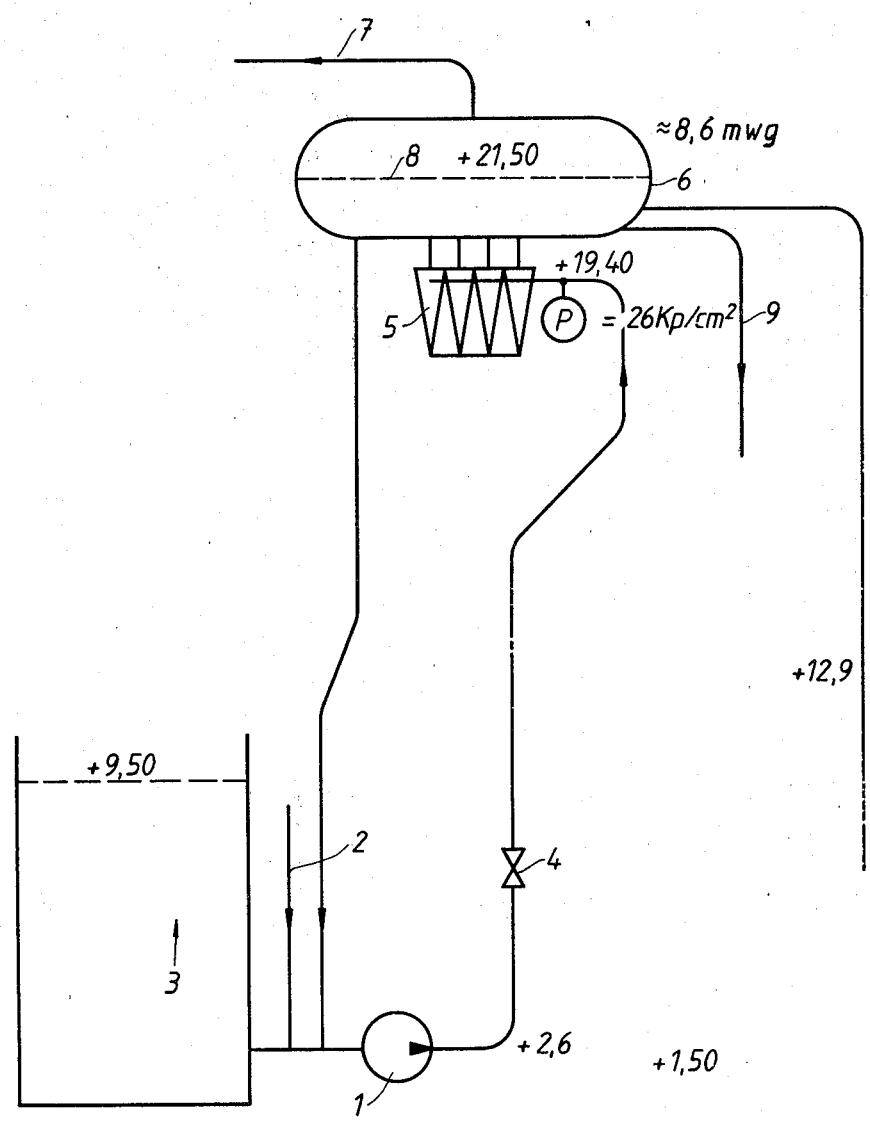
FIG. 1 is a schematic view of a prior art system for degassing a mixture of stock and white water in a paper making process.

FIG. 1 shows a prior art system for degassing a mixture of stock (i.e. paper fiber pulp) and dilution or white water in a paper making process. The system includes a mixing pump 1 for stock, supplied via a conduit 2, and dilution or white water supplied from a wire pit 3 and/or from another source. The pump 1 pumps up this stock/white water mixture from level +2.6 (see the levels, given in meters, above a reference level—i.e., the bottom of the wire pit supplying the white water—in FIG. 1) via a valve 4 and possibly also filters (not shown) to a bank of vortex cleaners 5 and then to a degassing or aeration tank 6. The concentration of the mixture is about 1% at the input to the vortex cleaners and, in the vortex cleaners, solid particles, such as sand and the like, are removed. In those cases where shives and other agglomerated products ("twin") have to be removed, filters are positioned in the conduit to the aeration tank 6. The inlet pressure of the incoming stock mixture to the vortex cleaners 5 is typically 26 mwg (meters of water gauge). Since the vortex cleaners 5 are directly connected to the aeration tank 6 with a negative pressure of 8.6 mwg, the pressure drop between the incoming and outgoing stock/white water mixture in the vortex cleaners is 34.6 mwg. This pressure difference is necessary for the vortex cleaners 5 to operate effectively, whereas the negative pressure in the aeration tank facilitates the removal of residual gases from the stock/white water mixture therein. The residual gases are removed from the tank 6 via a conduit 7 with the aid of a vacuum pump (not shown). The temperature in the tank is approximately +50° C., and the level 8 of the mixture is maintained substantially constant by means of a spillway (not shown) at a level of +21.5 meters above the reference level (i.e., +12 meters above the level of white water in the water pit).

From the tank 6, the degassed stock is pumped through a conduit 9 to a headbox (not shown) via a headbox pump (not shown). The headbox pump, the wire pit, the rejects outlet from the vortex cleaners and the outlet from the return conduit from the aeration tank must be located at such a level in relation to the aeration tank that the system is able to operate in view of the negative pressure prevailing in the tank. For practical reasons, the mixing pump and the headbox pump are often located at approximately the same level. Thus the aeration tank is located at a relatively high level, which involves a number of problems with tube lengths, return flows and a constructive erection of the degassing or aeration tank. Also, from the point of view of energy, this known arrangement has drawbacks.

Figure 3:
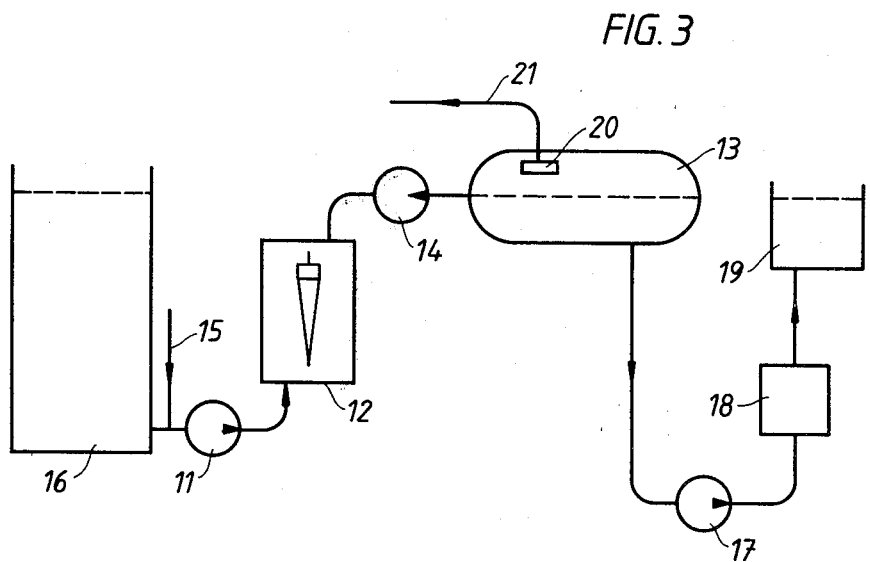
FIG. 3 is a schematic view of a system, according to the invention, for degassing a mixture of stock and white water in a paper making process.

In FIG. 3 there is shown an embodiment of a system according to the invention for degassing a mixture of stock and white water in a paper making process. The system mixes, in a mixing pump 11, white water from a wire pit 16 with the stock supplied through conduit 15 from a machine chest. The mixture is then passed through a vortex cleaner 12 to an aeration tank 13. The level of white water in the wire pit 16 is substantially the same as the level of the stock mixture in the aeration tank 13. This permits the mixing pump 11, the vortex cleaner 12 and the tank 13 to be placed at substantially the same level (the least energy-demanding level). Between the tank 13 and the vortex cleaner 12 there is placed a regenerative pump 14, the object of which is to slow down the mixture flow to the aeration tank 13 and bring about a suitable pressure across the vortex cleaner 12 which is necessary for the effective functioning of the cleaner 12. The regenerative pump 14 also controls the negative pressure in the tank 13 and enables the vortex cleaner 12 to operate as intended. In particular, the regenerative pump 14 enables the tank 13 to be positioned at a lower level than would otherwise be necessary to obtain the negative pressure in the aeration tank 13. Thus the aeration tank 13 is not at a high level as in the prior art system although the headbox pump 17 is positioned at a lower level (as before) in order to avoid cavitation. Numeral 18 designates a pressure filter and 19 is a headbox.

In the tank 13 a cooled baffle 20 is placed to prevent fluid from escaping from the tank 13 to a vacuum pump through a conduit 21. Thus only residual gases can pass to the vacuum pump.

The lengths and numbers of the supply and return conduits connected to the aeration tank are less than in the prior art system and this reduction also leads to a reduced formation of twin.

The mixture level in the tank 13 can be controlled by the regenerative pump 14. The baffle 20, as well as the other arrangements, and the regenerative pump 14 (with energy feedback to the network) result in a considerable energy saving over the prior art system. Energy saving is also achieved by replacing the regulating valve 4 (FIG. 1) with a variable-speed control of the regenerative pump 14 and by maintaining the negative pressure in the tank 13 through the regenerative pump 14.

Drive members to the regenerative pump 14 may be a variable-speed controlled motor, which may also operate as a generator, for example for feedback to the network such as by means of a frequency converter. The motor may also be a dc motor, driven from the network via a rectifier (not shown).

Figure 2:
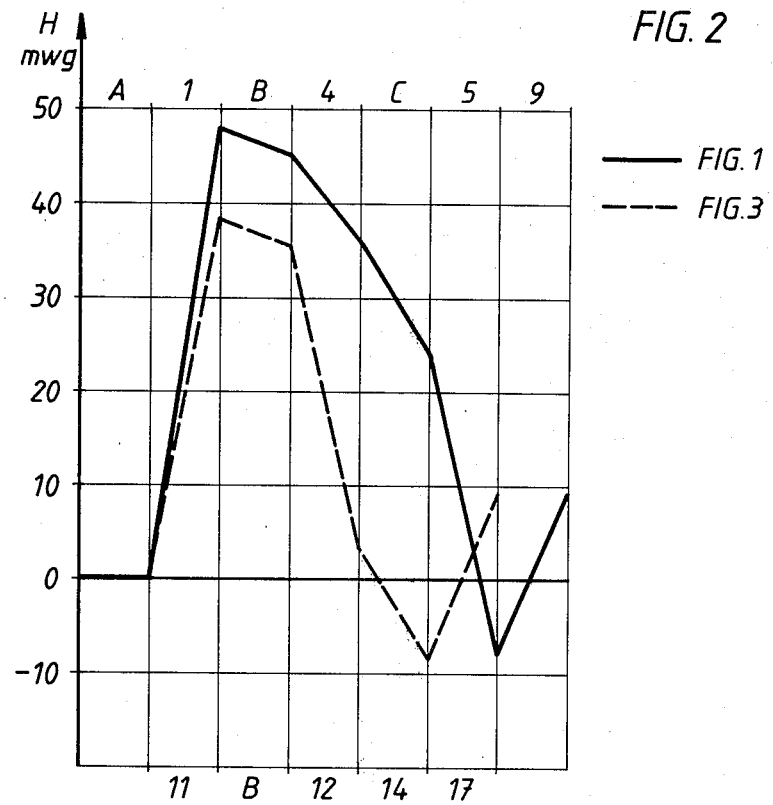
FIG. 2 is a graph comparing the pressures at different parts of the prior art system shown in FIG. 1 with the pressures at corresponding parts of a system according to the invention.

FIG. 2 shows, in graph form, the pressure distribution, (see broken line) for the various parts of the system according to the invention shown in FIG. 3 compared with the pressure distribution (see unbroken line) for the various parts of the prior art system shown in FIG. 1. The y-axis of the graph of FIG. 2 represents the pressure H in meters of water column (mwg) and the x-axis of the graph represents, in sequence, the various system parts or components.

The reference pressure at the bottom of the wire pit 16 is taken to be zero (see A) for both systems. The pressure increase after the pump 1 according to FIG. 1 is about 48 mwg, whereas the pressure at the mixing pump 11 according to the invention is 38 mwg. The pressure drops across the vortex cleaners 5 and 12 are assumed to be the same in both cases.

A certain pressure drop (see B) takes place across the conduits connecting the wire pit to the aeration tank in each system. After this there is, in the system according to the invention, a pressure drop of approximately 36.3 mwg across the vortex cleaner 12 and a further drop across the regenerative pump 14 so that the mixture as it enters the tank 13 has a negative pressure of −8.5 mwg. After this there takes place a pressure increase to the headbox pump 17.

With the prior art arrangement (see unbroken line in FIG. 2), the pressure drops across the valve 4. The pressure also drops because of the static lifting height requirement (see C) and because of the required pressure drop across the vortex cleaner 5. After this a pressure increase takes place to the headbox pump 9.

The reduced energy requirement in a system according to the invention is clearly seen from the plots shown in FIG. 2. In another embodiment of a system according to the invention, the aeration tank or tanks may have such a position relative to the mixing pump that the latter can simultaneously serve as a regenerative pump. In this case, the combined mixing and regenerative pump and the headbox pump may all be variable-speed controlled.

The invention can be varied in many ways within the scope of the following claims.

What is claimed is:

1. A method of degassing a mixture of a liquid first material and at least one second material, the liquid first material being initially contained in a container means, comprising the steps of withdrawing the liquid first material from the container means and mixing it with each second material to form a mixture, regeneratively pumping the mixture through a mixture cleaning means and into an aeration tank, and maintaining the level of the mixture in the aeration tank substantially even with the level of the liquid first material in the container means.

2. The method as defined in claim 1, including the step of applying a vacuum to the aeration tank to provide a subatmospheric pressure therein, the subatmospheric pressure being controlled by the amount of regenerative pumping applied to the mixture.

3. The method as defined in claim 2, wherein the vacuum applied to the aeration tank removes only residual gases therefrom.

4. In a system for degassing a mixture of a liquid first material and at least one second material which includes a container means for containing the liquid first material, an aeration tank, a mixture cleaning means and pumping and mixing means for mixing the liquid first material with the second material to form a mixture and pump the mixture through the mixture cleaning means into the aeration tank, the improvement wherein the pumping and mixing means includes a regenerative pump located between the mixture cleaning means and the aeration tank, the regenerative pump acting to slow down the mixture flow rate through the mixture cleaning means while permitting a pressure drop thereacross, and wherein the aeration tank, the mixture cleaning means and the pumping and mixing means are positioned to be at substantially the same level as the top of the container means, and such that the level of liquid first material in the container means can be maintained substantially even with the level of the mixture in the aeration tank.

5. The system as defined in claim 4, wherein the mixture cleaning means comprises a vortex cleaner.

6. In a system for degassing a mixture of stock and white water which includes a container means for containing the white water, an aeration tank, a mixture cleaning means, a pumping and mixing means and a headbox pump, the pumping and mixing means helping to mix the white water and the stock to form a mixture and pump the mixture through the mixture cleaning means into the aeration tank and the headbox pump helping to pump the degassed mixture out of the aeration tank, the improvement wherein the pumping and mixing means includes a regenerative pump located between the mixture cleaning means and the aeration tank, the regenerative pump acting to slow down the mixture flow rate through the mixture cleaning means while permitting a pressure drop thereacross, and wherein the aeration tank, the mixture cleaning means and the pumping and mixing means are positioned to be at substantially the same level as the top of the container means, and such that the level of white water in the container means can be maintained substantially even with the level of the mixture in the aeration tank.

7. The system as claimed in claim 6, wherein the pumping and mixing means further comprises a mixing pump between the container means and the mixture cleaning means.

8. The system as claimed in claim 7, wherein the regenerative pump is located between the mixture cleaning means and the aeration tank.

9. The system as claimed in claim 7, wherein the regenerative pump is located between the mixture cleaning means and the mixing pump.

10. The system as claimed in claim 7, wherein the headbox pump is positioned beneath the mixing pump.

11. The system as claimed in claim 6, wherein the regenerative pump also acts as a mixing pump.

12. The system as claimed in claim 11, wherein the said headbox pump is positioned beneath the said regenerative pump.

13. The system as claimed in claim 6, wherein the regenerative pump has drive means comprising a drive motor operable as a generator.

14. The system as claimed in claim 6, including evacuating means connected to the aeration tank and cooled baffle means located in the aeration tank so that the evacuating means is operative to remove only residual gases from the aeration tank.

15. The system as claimed in claim 6, wherein the mixture cleaning means comprises a vortex cleaner.

* * * * *